(12) United States Patent
Capasso et al.

(10) Patent No.: US 6,333,944 B1
(45) Date of Patent: Dec. 25, 2001

(54) SEMICONDUCTOR LASER FOR OPERATION IN LIBRATIONAL MODES

(75) Inventors: Federico Capasso, Westfield; Alfred Yi Cho, Summit; Claire F. Gmachl, Short Hills; Deborah Lee Sivco, Warren, all of NJ (US); Evgueni E. Narimanov, New Haven; Alfred Douglas Stone, North Haven, both of CT (US)

(73) Assignee: Yale University, New Haven, CT (US)

( * ) Notice: Subject to any disclaimer, the term of this patent is extended or adjusted under 35 U.S.C. 154(b) by 0 days.

(21) Appl. No.: 09/591,716

(22) Filed: Jun. 12, 2000

Related U.S. Application Data

(62) Division of application No. 09/063,577, filed on Apr. 21, 1998, now Pat. No. 6,134,257.

(51) Int. Cl.$^7$ ............................. H01S 3/083; H01S 3/18; H01S 3/19; H01S 3/08
(52) U.S. Cl. ............................. 372/45; 372/43; 372/44; 372/50; 372/92; 372/94; 372/98
(58) Field of Search ............................. 372/43, 44, 45, 372/50, 92, 94, 98

(56) References Cited

U.S. PATENT DOCUMENTS

| | | | |
|---|---|---|---|
| 4,638,485 | * 1/1987 | Gellerman et al. | 372/42 |
| 4,829,537 | * 5/1989 | Baer | 372/66 |
| 5,343,490 | 8/1994 | McCall et al. | 372/94 |
| 5,351,261 | 9/1994 | Lanzerotti et al. | 372/98 |
| 5,742,633 | * 4/1998 | Stone et al. | 372/92 |
| 6,134,257 | * 10/2000 | Capasso et al. | 372/94 |

OTHER PUBLICATIONS

S. L. McCall et al., *Whispering-gallery* . . . , Appl. Phys. Lett., vol. 60, No. 3, pp. 289–291 (1992).
A. F. J. Levi et al, *Directional light* . . . , Appl. Phys. Lett., vol. 62, No. 6, pp. 561–563 (1993).
A. F. J. Levi et al, *Room –temperature* . . . , Appl. Phys. Lett., vol. 62, No. 17, pp. 2021–2023 (1993).
Y. Yamamoto et al., *Optical Processes* . . . , Physics Today, pp. 66–73 (1993).
J.U. Noeckel et al., *Q spoiling* . . . , Optics Lett., vol. 19, No. 21, pp. 1693–1695 (1994).
J. U. Noeckel et al., *Optical Processes in Microcavities*, R. K. Chang et al., Eds. (World Scientific Publishers. Singapore, 1995), Ch. 11 entitled *Chaotic Light: A Theory of Asymmetric Resonant Cavities*.
J. U. Noeckel et al., *Directional emission* . . . , Optics Lett., vol. 21, No. 19, pp. 1609–1611 (1996).
J. Faist et al., *Quantum cascade* . . . , Appl. Phys. Lett., vol. 69, No. 17, pp. 2456–2458 (1996).
J. Faist et al., *High power mid–infrared* . . . , Appl. Phys. Lett., vol. 68, No. 26, pp. 3680–3682 (1996).

(List continued on next page.)

*Primary Examiner*—Teresa M. Arroyo
*Assistant Examiner*—Cornelius H. Jackson
(74) *Attorney, Agent, or Firm*—Michael J. Urbano

(57) ABSTRACT

A solid state laser comprises a cavity resonator in the form of a generally cylindrical body and, located within the resonator, an active region which generates lasing light when suitably pumped. The resonator has a relatively high effective refractive index (n>2 and typically n>3) is sufficiently deformed from circularity so as to support at least one librational mode (e.g., a V-shaped or a bow-tie mode, the latter being presently preferred for generating relatively high power, directional outputs). Specifically described is a Group III–V compound semiconductor, quantum cascade (QC), micro-cylinder laser in which the resonator has a flattened quadrupolar deformation from circularity. This laser exhibits both a highly directional output emission and a three-order of magnitude increase in optical output power compared to conventional semiconductor micro-cylinder QC lasers having circularly symmetric resonators.

3 Claims, 5 Drawing Sheets

(1 of 5 Drawing Sheet(s) Filed in Color)

OTHER PUBLICATIONS

J. U. Noeckel et al., *Ray and wave chaos* . . . , Nature, vol. 385, No. 6611, pp. 45–47 (Jan. 1997).

C. Gmachl et al., *Long–Wavelength* . . . , IEEE J. Quantum Electron, vol. 33, No. 9, pp. 1567–1573 (Sep. 1997).

J. Faist et al., *High–Power Continuous* . . . , IEEE J. Quantum Electron, vol. 34, No. 2, pp. 336–343 (1998).

Allowed patent application Ser. No. 08/725,127 filed on Oct. 2, 1996 and entitled Asymmetric Resonator Optical Cavity Apparatus (no copy enclosed).

* cited by examiner

SEMICONDUCTOR LASER FOR OPERATION IN LIBRATIONAL MODES

This is a divisional of application Ser. No. 09/063,577, filed on Apr. 21, 1998 now U.S. Pat. No. 6,134,257.

GOVERNMENT CONTRACTS

This invention was made with Government support under Contract No. DAAH04-96-C-0026 awarded by the DARPA/US Army Research Office and under Grant No. PHY9612200 awarded by the National Science Foundation. The Government has certain rights in this invention.

FIELD OF THE INVENTION

This invention relates generally to solid state lasers and, more particularly, to micro-cylinder solid state lasers.

BACKGROUND OF THE INVENTION

The superior properties of the laser as a light source have revolutionized optics in a wide variety of applications ranging from science and medicine on the one hand to optical communications and CD players on the other. A laser includes two basic components: an active region and an optical resonator. When suitably pumped by an energy source, the active region generates light at a center wavelength determined by the active region material or its structure. The resonator, which contains the active region and provides optical feedback for the stimulated emission of light, influences the special characteristics of the emitted light; e.g., its optical power, beam directionality and spectral properties. The resonator also determines the physical features of the laser such as its size and shape.

Semiconductor lasers, the most widely used and versatile class of lasers, typically employ resonator mirrors in the form of either cleaved crystal facets (Fabry-Perot cavities), etched distributed feedback (DFB) gratings, etched distributed Bragg reflectors (DBRs), or a suitable combination of them. In general, it is desirable to increase the reflectivity of the resonator mirrors in order to reduce the lasing threshold and the volume of the active region. Satisfying these desiderata reduces the pump energy required and increases the packing density capability of the lasers (e.g., in an array or an optical IC).

The prior art has made significant advances in the development of high reflectivity mirrors, particularly in the relatively recent, innovative design of microdisk lasers. These lasers, which exploit total internal reflection (TIR) of light to achieve mirror reflectivity very close to unity, are based on circularly symmetric (e.g., cylindrical or disk-like) resonators. These resonators support lasing in what is known as whispering gallery (WG) modes. See, for example, S. L. McCall et al., *Appl. Phys. Lett.*, Vol. 60, No. 3, pp. 289–291 (1992), which is incorporated herein by reference. In a WG mode, as shown in FIGS. 3A (right inset) and 5A, light circulates along a modal path that stays near to the curved cylindrical boundary of the resonator, reflecting from the walls of the resonator at an angle of incidence always larger than the critical angle for TIR. Thus, essentially all of the circulating light remains trapped inside the resonator, with only minute losses of light due to evanescent leakage through the boundary (i.e., tunneling) and due to scattering from roughness on the wall surfaces. Significant additional characteristics of WG modes relate to their angle of incidence at the resonator boundary and their sense of rotation within the resonator. More specifically, the angle of incidence, $\chi$, is conserved. That is, the WG mode always impinges on the boundary at the same angle such that $\sin\chi \geq 1/n$. And, the sense of rotation for a light ray propagating along a particular modal path is constant in time and fixed in space; e.g., it is either clockwise or counter clockwise along a given modal path, and it does not change its sense of rotation with time. See, for example, J. U. Noeckel et al., *Optical Processes in Microcavities*, R. K. Chang et al., Eds. (World Scientific Publishers, Singapore, 1995), Ch. 11 entitled *Chaotic Light: A Theory of Asymmetric Resonant Cavities* (hereinafter, Noeckel 95), which is incorporated herein by reference.

Serious disadvantages of microdisk lasers based on WG modes, however, include relatively low output power (in the range of a microwatt for mid-infrared quantum cascade microdisk lasers) due to the high Q of the resonator, and the lack of directional output emission due to the circular symmetry. Thus, a need remains in the art for a microdisk laser design that provides relatively high output power as well as output beam directionality.

Recent theoretical work on WG mode resonators formed in relatively low refractive index materials (n<2) has addressed the issue of directional emission. See, for example, J. U. Noeckel et al., *Nature*, Vol. 385, No. 6611, pp. 45–47 (1997; hereinafter Noeckel 97), J. U. Noeckel et al., *Opt. Lett.*, Vol. 21, No. 19, pp. 1609–1611 (1996, hereinafter Noeckel 96), J. U. Noeckel et al., Opt. Lett., Vol. 19, No. 21, pp. 1693–1695 (1994, hereinafter Noeckel 94), all of which are incorporated herein by reference, and Noeckel 95, supra. The resonators studied were asymmetric resonant cavities (ARCs), which are WG resonators with weak deformations from circular cylindrical (or spherical) symmetry. The ray dynamics of these deformed resonators is either partially or fully chaotic in the generic case. See, Noeckel 95, supra. In a chaotic resonator, for a large fraction of the ray trajectories (i.e., the orbits or modal paths corresponding to given modes), the trajectory of a subsequent ray, which differs in launch conditions (i.e., starting point and launch angle) by even the smallest amount from an original ray, cannot be predicted from the launch conditions of the original ray.

The type of deformation studied in greatest depth in this body of theoretical work is a two-dimensional convex resonator with a quadrupolar deformation of the circular boundary, described in polar coordinates (r,$\phi$) by the following expression:

$$r(\phi) \propto (1+\epsilon \cos 2\phi) \tag{1}$$

where $\epsilon$ is the deformation parameter. Equation (1) implicitly defines a coordinate system where $\phi=0°$ corresponds to the direction of highest curvature and is oriented parallel to the major (elongated) axis of the deformed cross-section. Partially chaotic WG modes in these resonators have shown directional lasing emission in relatively low refractive index materials (n<2; e.g., glass fibers or cylindrical dye jets). See, Noeckel 96, supra. The origin of the directional emission is found in Noeckel 97, supra. That is, the deformed boundary causes the angle of incidence of a ray in a WG mode to fluctuate in time and on average to increase. Eventually a ray initially trapped by TIR impinges on the boundary below the critical angle and escapes by refraction. The direction of emitted light can in principle be controlled by a suitable choice of deformation parameter. But, this work did not consider the effects associated with higher index materials (e.g., n>3.3 typical of Group III–V compound semiconductor lasers). In particular, it did not demonstrate how to obtain higher output power in semiconductor microdisk lasers.

SUMMARY OF THE INVENTION

In accordance with one aspect of our invention, a solid state laser comprises a cylindrical cavity resonator having a curved boundary and, located within the resonator, an active region which generates stimulated emission of radiation when suitably pumped. The effective refractive index of the resonator is sufficiently high (n>2 and typically n>3), and the curved boundary (i.e., the relevant cross-section) of the resonator is sufficiently deformed from circularity so as to support at least one librational mode. A librational mode is characterized by a sense of rotation that is not constant (or conserved) and by a modal path that is not confined to the vicinity of the resonator boundary. Instead, the direction of propagation along a modal path may reverse itself with time and thus change the sense of rotation from clockwise to counter clockwise, or conversely. Moreover, librational modes propagate along trajectories that pass through the central region of the resonator.

Illustratively, the librational mode has a V-shape or a bow-tie shape, the latter being presently preferred for generating relatively high power, directional outputs. As applied to Group III–V compound semiconductor micro-cylinder lasers, we have demonstrated a quantum cascade (QC) laser having both a highly directional output emission and a three-order of magnitude increase in optical output power compared to conventional semiconductor microdisk, mid-infrared, QC lasers having circularly symmetric resonators. This embodiment of our laser operated in a bow-tie mode supported by an ARC defined approximately by a flattened quadrupolar distortion with a distortion parameter in the approximate range of $0.12 \leq \epsilon \leq 0.2$. In polar coordinates the distortion function is given by $$r(\phi) \propto (1+2\epsilon \cos 2\phi)^{1/2} \quad (2)$$

However, other forms of distortion, such as dipolar, bulging quadrupolar or octapolar, may also be useful in the context of generating librational modes.

BRIEF DESCRIPTION OF THE DRAWING

This application contains at least one drawing executed in color.

Our invention, together with its various features and advantages, can be readily understood from the following more detailed description taken in conjunction with the accompanying drawing, in which:

FIG. 2, inset, is a graph showing the maximum (peak) output power versus the deformation parameter $\epsilon$. The collector, with an aperture width of 15°, was centered around $\phi=0°$. The solid circles and open squares represent data from two independent, but similar sets of lasers. The power output was normalized to the power output of the respective circular cylindrical laser. As the deformation parameter increased, the peak output power increased, and we measured a concomitant decrease in the lasing threshold current density from about 7 kA/cm$^2$ to about 4 kA/cm$^2$. The data show an increase of peak output power by a factor of 50, which translates into a factor of over 1000 when the 30:1 normalization of FIG. 3C is taken into account, and the detection angle is rotated into a position at approximately $\phi=45°$.

FIG. 3A, left inset, shows a spectrum in linear scale obtained close to the laser threshold from a laser with low deformation (e.g., $\epsilon \approx 0.06$). The spectrum, with close mode spacing of $\Delta\lambda \geq 15$ nm is due to the lasing of several types of WG modes. The displayed linewidth is limited by the experimental set-up and the data acquisition system. FIG. 3A, right inset, is a schematic representation of the WG modes of these lasers.

FIG. 3C, left inset, is a logarithmic plot of the measured spectrum at maximum power (power P vs. wavelength $\lambda$) of a laser with $\epsilon \approx 0.16$. Six equally spaced modes, with mode spacing $\Delta\lambda=40.4$ nm, were observed. This mode separation is in good agreement with the value of 39.5 nm calculated for a bow-tie mode corresponding to the intensity pattern of FIG. 3D. FIG. 3C, right inset, is a schematic representation of a bow-tie mode of these lasers at relatively high deformation (e.g., $\epsilon \geq 0.12$ approximately).

Figure 1A:
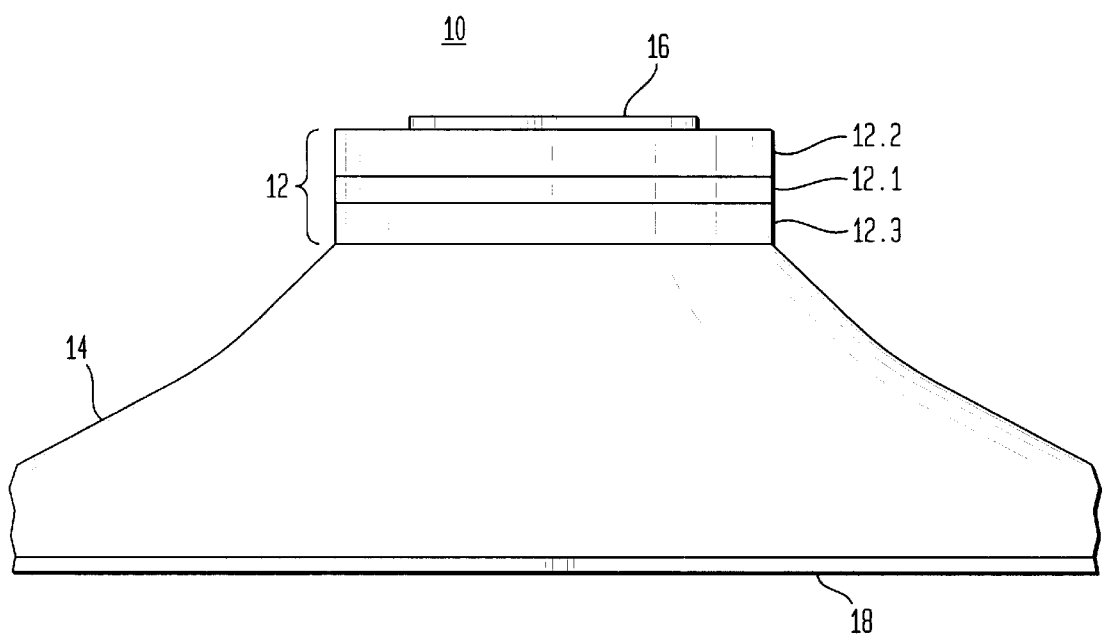
FIGS. 1A and 1B are schematic side and top views, respectively, of a micro-cylinder QC laser in which the resonator is deformed from circularity in accordance with one embodiment of our invention.
Figure 5A:
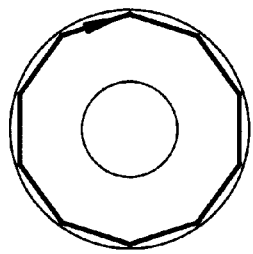
FIG. 5 is a series of schematic ray pictures of WG modes (FIG. 5A for $\epsilon=0$.
FIG. 5B for low $\epsilon$) and of librational modes which are supported by more highly deformed resonators (FIG. 5C depicts a V-shaped mode, and FIG. 5D a bow-tie mode).
Figure 5B:
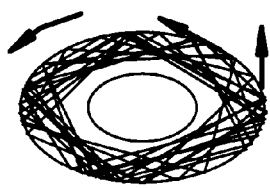
Figure 5C:
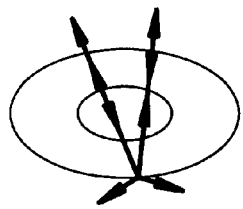
Figure 5D:
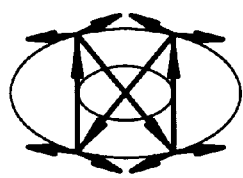
Figure 6:
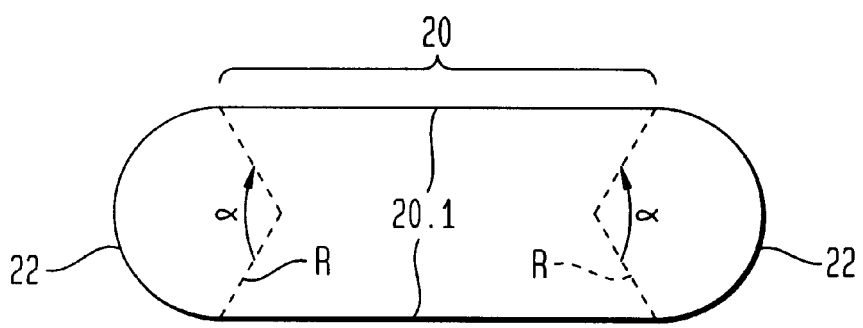
FIG. 6 is a top view of a resonator having the shape of a modified stadium.

In the interest of clarity and simplicity, the FIGS. 1, 5 and 6 have not been drawn to scale. In addition, when describing physical or optical dimensions, the symbol A stands for Angstroms, whereas when describing electric current, it stands for Amperes.

DETAILED DESCRIPTION OF THE INVENTION

With reference now to FIG. 1, a solid state, micro-cylinder laser 10 in accordance with one aspect of our invention comprises a cylindrical body 12 disposed on a support or pedestal 14. An active region 12.1 is included within the body. When suitably pumped, the active region generates stimulated emission of radiation (light) at a center wavelength determined by the bandgap of the active region material (e.g., in semiconductor diode lasers) or by quantum confinement characteristics of the structure (e.g., in semiconductor quantum cascade (QC) lasers). Illustrative semiconductors include Group III–V, Group II–VI and Group IV–VI compound materials. However, the active region material is not limited to semiconductors; it could comprise other relatively high refractive index, solid state materials.

For purposes of illustration, the laser 10 is depicted as having a pair of electrodes or contacts 16 (on body 12) and 18 (on pedestal 14) so that the active region can be pumped by means of an electric current supplied by a voltage source (not shown) connected across the electrodes. However, other forms of pumping well known in the art may also be utilized; e.g., optical pumping, in which case the electrodes could be omitted or made transparent to the pumping radiation.

In one embodiment of a semiconductor micro-cylinder laser, the active region is disposed between an upper cladding region 12.2, on which electrode 12.2 is formed, and a lower cladding region 12.3 disposed on the pedestal 14. The cladding regions generally have a lower refractive index than the active region and thereby serve to confine most of the energy of the lasing modes to the active region; i.e., the light intensity decreases exponentially in the cladding regions.

In accordance with another aspect of our invention, the boundary of body 12, or at least the boundary of active region 12.1, forms a cylindrical cavity resonator which is sufficiently deformed from circularity, and the effective refractive index of the resonator is sufficiently high, so that the resonator supports at least one librational mode (e.g. a V-shaped mode or a bow-tie mode as shown in FIGS. 5C and 5D, respectively) and provides a directional output beam.

The effective refractive index of the resonator takes into account those regions of the body 12 into which stimulated radiation penetrates, as well the surrounding air (n=1) and/or substrate if the radiation penetrates significantly outside the body 12. For example, if the body 12 includes a solid state waveguide that strongly confines the light to the body 12, then the effective refractive index would be essentially the average of the refractive indices of the layers making up the active and cladding regions (e.g., n≈3.5 for many Group III–V compound semiconductors). However, if the body 12 contains no cladding layers and, therefore, the light penetrates significantly into air, then the effective refractive index would be lower. An illustration of the latter is found in C. Gmachl et al., *IEEE J. Quantum Electron.*, Vol. 33, No. 9, pp. 1567–1573 (1997), which is incorporated herein by reference. This paper describes a Group III–V compound, microdisk QC laser designed for operation at a center wavelength of about 9.5 $\mu$m. Because the active region (n≈3.5) was a thin (2 $\mu$m), unclad disk mounted on a narrow pedestal, the stimulated radiation penetrated significantly into the surrounding air, reducing the effective refractive index to about 2.54.

The deformation from circularity may take on various forms such as simple quadrupolar as defined by equation (1), flattened quadrupolar as defined by equation (2), and bulging quadrupolar given by k>1 (e.g., k=2) in equation (3) below:

$$r(\phi) \propto [1+\epsilon/k(\cos 2\phi)]^k \quad (3)$$

In general, k is a positive number; for k=1 equation (3) yields the simple quadrupolar equation (1), for k<1 equation (3) yields a flattened quadrupolar [e.g., k=½, as in equation (2)], and for k>1 equation (3) yields a bulging quadrupolar. Other deformations which might also find application in specific embodiments of our invention are dipolar given by equation (4) below:

$$r(\phi) \propto (1+\epsilon/k \cos \phi)^k \quad (4)$$

where, as with quadrupolar deformation, k=1 is a simple dipolar, k<1 is flattened dipolar, and k >1 is bulging dipolar. A resonator with dipolar deformation could be particularly useful in supporting V-shaped modes. Finally, higher order deformations such as octapolar may also be useful.

Moreover, it is presently preferred that the curved boundary of the resonator be convex (i.e., at no point does the curvature of the relevant cross-section of the boundary change sign), but not precisely elliptical (the latter shape does not support librational modes). However, there may be special cases of largely convex resonators, with one or more concave sections, which do support librational modes.

In a currently preferred embodiment, the micro-cylinder laser 10 comprises a QC laser made of Group III–V compound semiconductors having a relatively high refractive index (i.e., n>3.3) and the resonator is deformed from circularity approximately in accordance with the flattened quadrupolar equation (2). Deformation parameters $\epsilon \geq 0.12$, approximately, provide resonators which support librational modes, particularly bow-tie modes. Lasers operating in such modes have produced directional output beams at nearly 10 mW of optical power, more than three orders of magnitude greater than that of mid-infrared QC microdisk lasers having circular resonators.

EXAMPLE

Device Design and Fabrication

This example describes a Group III–V compound semiconductor, micro-cylinder, QC laser in accordance with one embodiment of our invention. Various materials, dimensions and operating conditions are provided by way of illustration only and, unless otherwise expressly stated, are not intended to limit the scope of the invention.

The QC laser is particularly suited for two-dimensional micro-cylinder geometries. See, for example, J. Faist et al., *Appl. Phys. Lett.*, Vol. 69, No.17, pp. 2456–2458 (1996), which is incorporated herein by reference, and C. Gmachl et al., supra. This type of laser is based on a transition between quantized conduction band states of a cascaded InGaAs/InAlAs coupled quantum-well structure (intersubband transition). As such, the selection rule of the optical transition allows light emission only in the two-dimensional plane with polarization normal to the quantum well layers; i.e., transverse magnetic (TM) polarization. Therefore, virtually no light is lost in the direction perpendicular to the resonator plane. Furthermore, the QC laser is a unipolar device based on only electron transport, unlike diode lasers. Thus, in contrast to most conventional semiconductor lasers, the surface does not cause excess, unwanted non-radiative surface recombination of electrons and holes. Finally, the wavelength of operation (e.g., 3.5–13 $\mu$m) is comparatively large, and the material used is a well understood semiconductor system. These features reduce the importance of roughness (Rayleigh) scattering and make it easier to fabricate complex shapes needed for the resonator.

The layers of the QC active region 12.1, designed to emit at about 5.2 $\mu$m, comprised an $In_{0.53}Ga_{0.47}As/In_{0.52}Al_{0.48}As$ heterostructure grown by molecular beam epitaxy (MBE) lattice-matched to an InP substrate. The effective refractive index of the body 12 (i.e., active region together with the cladding regions) was about 3.3. As described in greater detail below, the heterostructure was ultimately shaped into the form of disk 12 and the substrate into the form of pedestal 14.

The InGaAs/InAlAs active region is well known in the art and is considered a mature and virtually optimized design for high quality laser performance. More specifically, the active region included 25 cascaded stages of so-called three-well vertical radiative transition regions with matching electron injection/relaxation regions. See, J. Faist et al, *Appl. Phys. Lett.*, Vol. 68, No. 26, pp. 3680–3682 (1996) and J. Faist et al., *IEEE J. Quantum Electron.*, Vol. 34, No. 2, pp. 336–343 (1998), which are incorporated herein by reference. The cladding regions 12.2 and 12.3 each comprised three sub-layers: (1) a low doped InGaAs layer (Si doped to $2\times10^{17}$ cm$^{-3}$ and 350 nm thick) adjacent the active region, (2) an inner, low doped InAlAs layer (itself actually two is sub-layers: a first sub-layer Si doped to $2\times10^{17}$ cm$^{-3}$ and 300 nm thick; and a second sub-layer Si doped to $3\times10^{17}$ cm$^{-3}$ and 400 nm thick), and an outer, highly doped InAlAs layer (Si doped to $7\times10^{18}$ cm$^{-3}$ and 1000 nm thick). At the interface between the InGaAs and InAlAs layers in upper cladding region 12.2 a two-dimensional gas (2DEG) was formed by a highly doped, thin portion (Si doped to $5\times10^{18}$ cm$^{-3}$ and 8 nm thick) of the InAlAs layer close to the interface. The latter structure together with a highly doped cap-layer (Sn doped to $1\times10^{20}$ cm$^{-3}$ and 100 nm thick) facilitated lateral current spreading and hence pumping of the entire volume of the active region.

The entire waveguide, formed by the active region and the two cladding regions, was designed to be symmetric and such that the lasing mode (the lowest order TM mode) had little (<0.5%) overlap with the InP substrate/pedestal. Thus, the possible detrimental effects of coupling light into the substrate were strongly reduced.

Figure 1B:
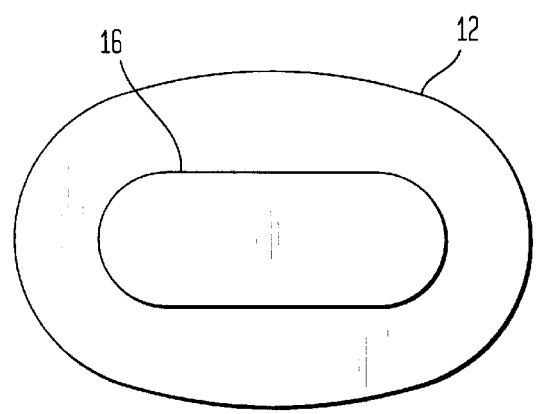

The geometry of the resonator was realized by optical lithography and wet chemical etching. The approximate flattened quadrupolar shape was obtained by starting from a photoresist pattern that was composed of two semi-circles connected by a rectangle. The samples were then etched in an aged solution of 1:1:10 HBr:HNO$_3$:H$_2$O until deep mesas were obtained. Due to the smoothing action of the etchant the straight section of the etch mask bends towards the curved parts rendering a quadrupole-like shape of the disk 12, as shown in FIG. 1B. We controlled the photolithographic and etching processes so that we were able to fabricate lasers with deformation parameters ranging from 0 to about 0.2 in ten steps of 0.02 each. For all such lasers the height of the disk was about 5.4 $\mu$m (i.e., the total thickness of the MBE layers), whereas the lengths of its major and minor axes were varied as discussed below.

Electrode 16 (non-alloyed Ti/Au) and electrode 18 (non-alloyed Ge/Au/Ag/Au) formed ohmic contacts to the laser.

Experimental Procedure

Several sets of samples were fabricated. As noted above, the deformation parameter was varied in ten steps from 0 to about 0.2. Two different size resonators were investigated in order to quantify and rule out size dependent effects. In one resonator the minor axis was about 50 $\mu$m and the major axis was varied from 50 $\mu$m ($\epsilon$=0) to 80 $\mu$m ($\epsilon\approx$0.2), whereas in the other resonator the minor axis was about 30 $\mu$m and the major axis was varied 30 $\mu$m to 50 $\mu$m.

In order to insure that no additional directionality was introduced into the system other than through the flattened quadrupole, the rim of the top electrode 16 had essentially the same distance from the edge of the disk 12 for all lasers (with the same length of the minor axis) and in all directions of $\phi$. In addition, the lasers were tested with their major axis oriented at 0°, 45° and 90° to the major orientation of the semiconductor crystal. Finally, our processing techniques left the surface clean without evident sources of surface roughness scattering.

In making our measurements the lasers were driven with current pulses (duration about 50 ns; repetition rate about 40 kHz) and the light output was measured using a cooled HgCdTe detector and a well known lock-in technique. To improve power output and avoid excess current heating the measurements were made at heat sink temperatures of 40°K.–100° K. Nevertheless, the maximum pulsed operating temperature of the lasers was 270° K. The spectral properties were measured using a Fourier transform infrared (FTIR) spectrometer.

The lasers emitted light according to their symmetry into all quadrants of the two-dimensional laser plane. We collected the laser light output into an appropriate aperture. Its center angle was varied for acquisition of the far-field pattern. The small amount of light escaping vertical to the resonator plane results from diffraction and was measured integrated over the vertical extension. Using the polar coordinate system defined earlier, $\phi$=90° denotes the direction of the minor axis of the resonator, whereas $\phi$=0° denotes the direction of the major axis. Hence, a measurement taken at $\phi$=0° means that the detector or collector was facing one point of highest curvature of the deformed resonator.

Results

Figure 2:
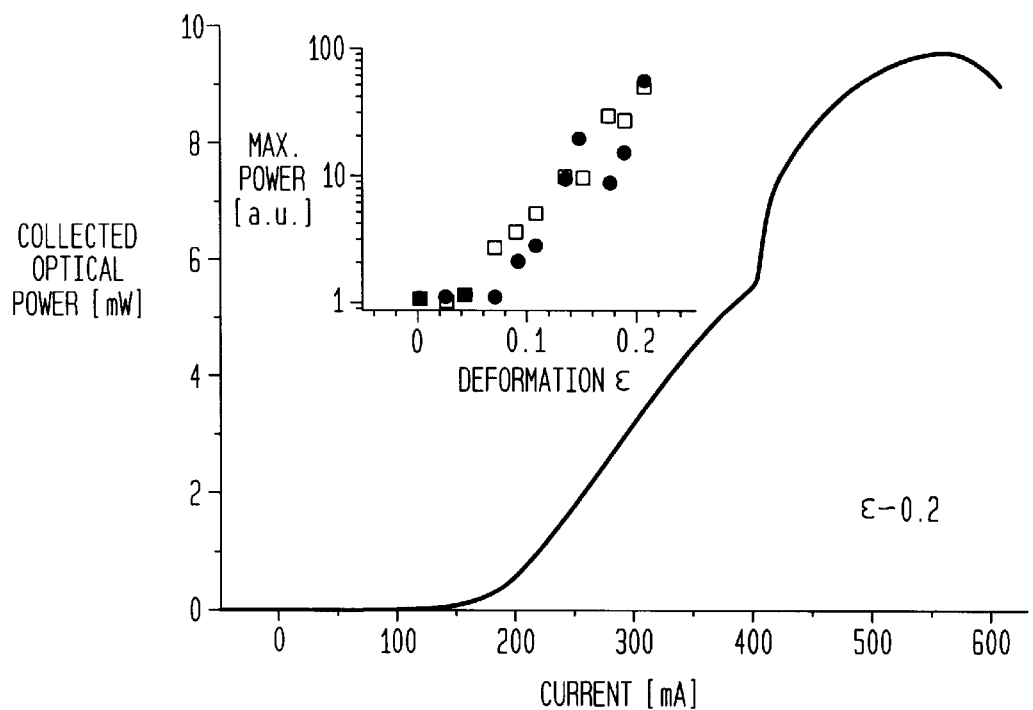
FIG. 2, main graph, shows the light output power vs. pump current for a laser of the type shown in FIG. 1 in which the resonator has a flattened quadrupolar deformation given by equation (2) with the deformation parameter $\epsilon=0.2$ approximately. The light was collected by integrating over angles from $\phi=+40°$ and $\phi=+100°$ in the polar coordinate system previously described. The kink around 400 mA indicates the onset of a second lasing mode. The measurements were performed at a 100° K. heat sink temperature, but the lasers were tested (pulsed operation) up to 270° K. In fact, the maximum collected output power was nearly 10 mW.

QC lasers with cylindrical resonators deformed in accordance with our invention have exhibited a dramatic increase both in output power and in directionality. FIG. 2 summarizes the results of the output power analysis. A striking result is the strong quasi-exponential) increase of the collected optical power with increasing deformation, as shown in the inset. For the largest deformation under consideration ($\epsilon\approx$0.2) a power increase of a factor of 50 with respect to a laser with a circular resonator was observed when the light was collected in a narrow aperture around $\phi$=0°. Further enhancement in the collected power was obtained by taking advantage of the strongly structured far-field pattern.

The absolute power was also measured in some lasers with relatively high degrees of deformation. One example, obtained from a laser with $\epsilon\approx$0.2, is shown in the main graph of FIG. 2. A peak output power of about 10 mW was obtained. This value is approximately three orders of magnitude larger than that obtained from lasers in which the resonator were not deformed or from prior conventional QC micro-cylinder lasers with circular resonators. See, for example, J. Faist et al., *Appl. Phys. Lett.*, supra and C. Gmachl et al., *IEEE J. Quantum Electron.*, supra.

A quasi-exponential increase of the collected power with increasing deformation, similar to that shown in the FIG. 2 inset, was also measured in numerous sets of lasers of various quadrupolar shapes and sizes and with various orientations of the collecting aperture. We conclude, therefore, that the power increase is a reliable, universal effect. On the other hand, the increase in output power per unit angle is closely related to the actual variation of the far-field pattern with deformation. In fact, in our lasers the power increase with deformation results from the lasing of different types of modes in different ranges of the deformation parameter. We have discovered that there is a cross-over at intermediate deformations ($\epsilon \approx 0.12$) from the emission via WG modes (which dominates at smaller deformations) to the emission from bow-tie modes (which do not exist below $\epsilon \approx 0.10$, but dominate at higher deformations).

Figure 3A:
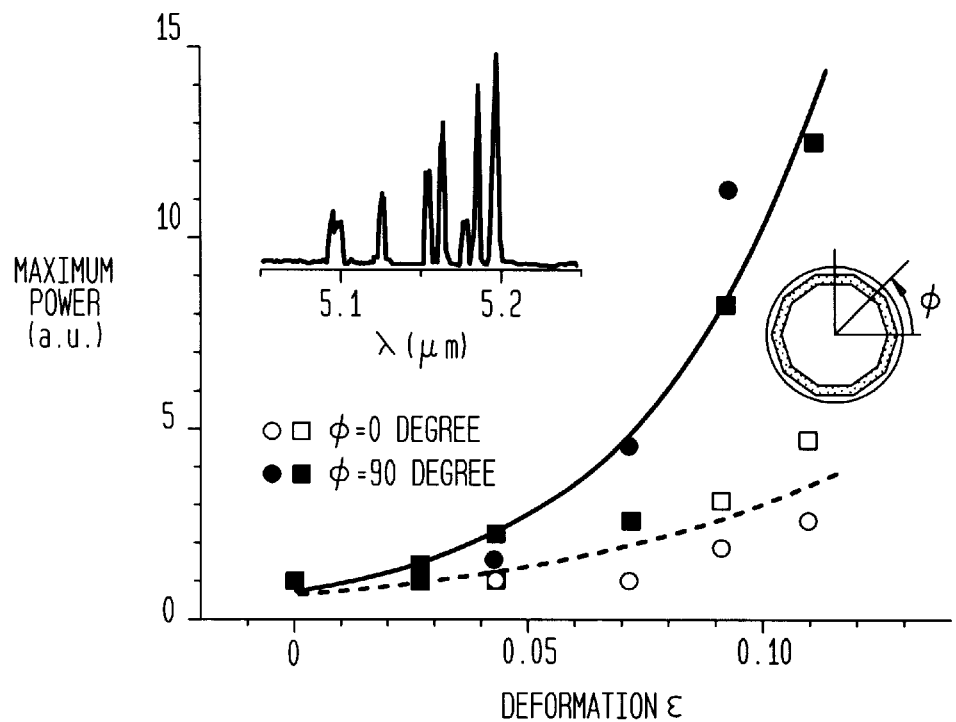
FIG. 3A, main graph, shows the maximum output power vs. deformation parameter for lasers with relatively low deformation parameter ($\epsilon \leq 0.11$). These lasers operated in WG modes, not in librational modes. In the experimental set-up a light collector was positioned at $\phi=90°$ (solid squares and circles) and at $\phi=0°$ (open squares and circles) with a fixed aperture width of 15°. The circles and squares represent two independent, but similar sets of lasers for each orientation of the aperture. Both curves rise approximately exponentially as indicated by the dashed lines.
Figure 3C:
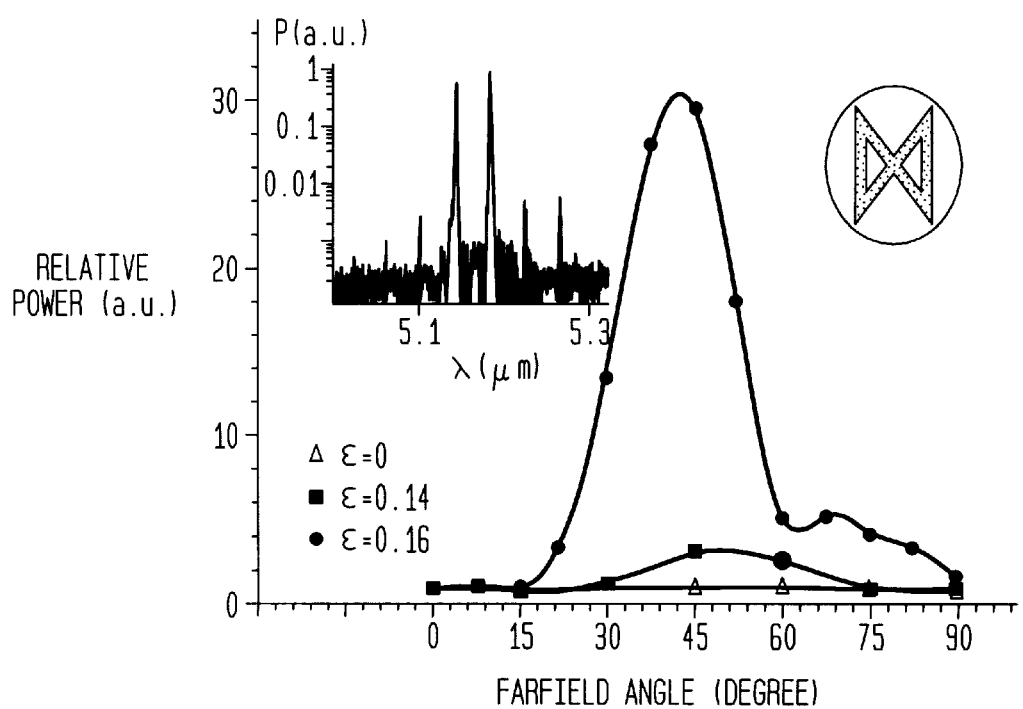
FIG. 3C, main graph, shows the measured, angle-resolved, far-field pattern (one quadrant) of a laser with a circular resonator (triangular data points) and two lasers with resonators deformed by $\epsilon=0.14$ (square data points) and $\epsilon=0.16$ (circular data points). The data are normalized to the value measured at $\phi=0°$ and show highly directional emission and an increased power output (per unit angle) in the far-field by a factor of up to 30.

In addition to the strong increase in output power, our lasers with deformed resonators also exhibit strong directionality, as demonstrated by the far-field measurements shown in FIG. 3A and FIG. 3C. On the other hand, lasers with circular cylindrical resonators display no directionality of their output emission.

Figure 3B:
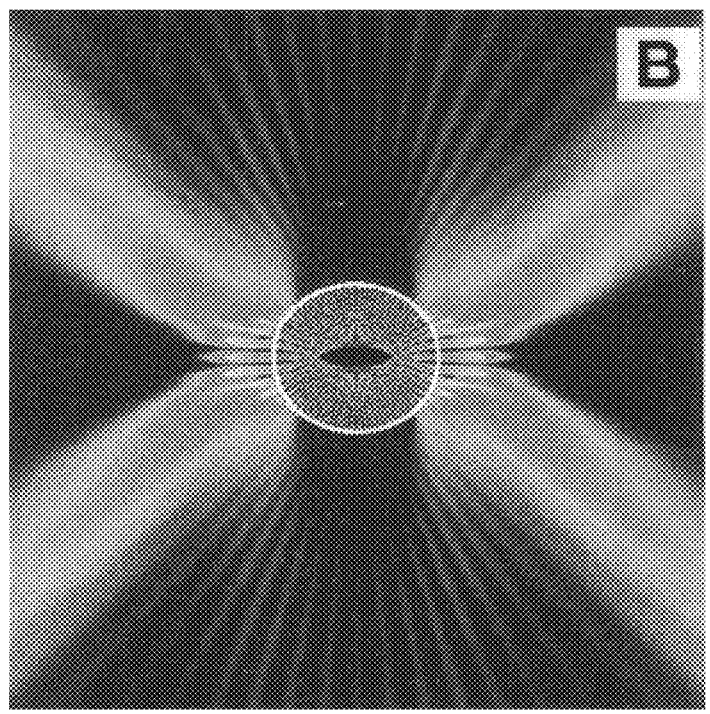
FIG. 3B is a calculated representation (obtained by numerical solution of Maxwell's wave equations) of the radiation (light) intensity pattern of an exemplary WG mode for a laser with low deformation $\epsilon \approx 0.06$.

At relatively small deformations ($\epsilon \leq 0.12$ approximately) the far-field is only weakly structured with an increased emission in the direction of the minor axis compared to the major axis. FIG. 3A shows the increase of the output power with increasing $\epsilon$, with the light collected around ($\phi=0°$ and $\phi=90°$. Both curves rise exponentially, as discussed above, but faster for the case of $\phi=90°$. The exponent is increased by a factor of about 2 compared to the case of $\phi=0°$. This behavior is consistent with spoiling of the high reflectivity of the WG modes as the resonator is deformed; i.e., as a ray, associated with a lasing WG mode, travels along a deformed curved boundary, it is most likely to strike below the critical angle for TIR at a location (at or near $\phi=0°$, 180°) corresponding to emission at glancing angles of refraction (with the direction tangent to the point of maximum curvature). Accordingly, we expect the high output to be enhanced at $\phi=90°$ in the far-field. FIG. 3B shows the calculated intensity pattern (the modulus squared of the electric field) for a WG mode in a deformed resonator with $\epsilon \approx 0.06$. Application of a chaotic ray dynamics model to this case confirms enhanced emission at $\phi=90°$.

At higher deformations in accordance with our invention $\epsilon \geq 0.14$ approximately), we detected the onset of a different type of, and even stronger, directionality. FIG. 3C shows the actual angle-resolved far-field pattern (one quadrant) of one laser having a circular resonator and two lasers having resonators with approximately flattened quadrupolar deformation. Our lasers exhibited a power increase by a factor of up to 30 into an emission angle of $\phi=42°$ compared to $\phi=0°$. The angular width of this directional emission was about 23°. Around $\phi=0°$ we observed a clear minimum of the emission and a smooth sloping plateau towards $\phi=90°$.

At these relatively large deformations the general ray motion is highly chaotic in most of the phase-space. Therefore, the likely scenario for generating directional emission is for the lasing modes to be associated with the small regions of stable, regular motion which still remain, as seen in a Poincare surface of section (SOS), not shown.

For the range of deformations studied (approximately $0.12 \leq \epsilon \leq 0.2$), only two such regions exist. The first is based on diametral orbits running along the minor axis of the resonator. The associated modes are the transverse modes of the stable, curved mirror Fabry-Perot resonator. However, these modes correspond to normal incidence at the boundary and, as such, would result in a peak emission at $\phi=90°$ in the far field, much in contrast to our observations. Furthermore, the low reflectivity of the boundary at normal incidence combined with the short length of the minor axis (and hence commensurately lower gain) result in a threshold too high for lasing.

Figure 3D:
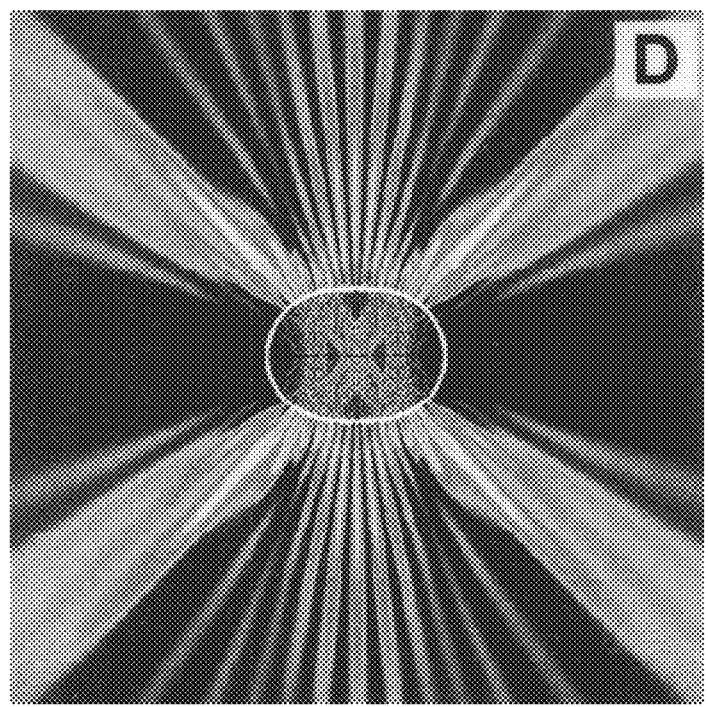
FIG. 3D is a calculated representation of the radiation (light) intensity pattern of a bow-tie mode for a laser with a relatively high deformation $\epsilon=0.15$.

The second region is in the vicinity of a stable four-bounce periodic orbit with the shape of a bow-tie (FIG. 5D). The calculated intensity pattern for this mode is shown in FIG. 3D. The orbit of this mode comes into existence by bifurcation from the diametral orbit at about $\epsilon=0.10$ and has four equal (in absolute value) angles of incidence, $\chi$, on the boundary of the resonator. At $\epsilon \approx 0.12$ this angle is about 12.5° and is well below the critical angle for TIR ($\chi_c=17.50$), but as the deformation increases to $\epsilon \approx 0.15$, this angle increases to approximately the critical angle. Consequently, the boundary has sufficiently high reflectivity to allow lasing. More specifically, we have calculated reflectivites of 0.45, 0.60 and 0.76 for $\epsilon=0.125$, 0.14 and 0.15, respectively. In fact, the increase in reflectivity with deformation, we believe, should lead to a reduction of the lasing threshold. We observed such a threshold reduction from 5 kA/cm$^2$ ($\epsilon=0.12$) to 3.9 kA/cm$^2$ ($\epsilon \approx 0.2$). This decrease in lasing threshold (approximately 30%) may also be the origin of the observed increase in maximum peak output power for relatively large deformations. (See, the inset to FIG. 2.)

Note also that the positive effect of the reduction of the lasing threshold on the over-all performance of the QC laser outweighs the decrease in output coupling efficiency with increasing reflectivity.

Numerical solutions of the wave equation corresponding to the bow-tie mode result in an intensity pattern shown in FIG. 3D. When the intensity pattern of such a resonance was averaged in the far-field according to the experimental aperture, we found very good agreement between the experimental and theoretical far-field directionality, as shown in FIG. 3C. From these results, and the spectral properties discussed, infra, we conclude that the laser emission at relatively high deformations originates from the bow-tie modes newly discovered in these structures. The bow-tie orbit, however, is just one of several orbits which move around the minor axis in a librational motion (as contrasted with the rotational motion of WG modes). Others librational modes include, for example, the V-shaped mode of FIG. 5C.

Besides the increase in output power and directionality in our lasers, the increased deformation also influences the spectral properties of the laser, which further confirms the existence of two different modal regimes manifested so clearly in the different types of far-field patterns.

Characteristic spectra are shown in the insets to FIGS. 3A and 3C. At relatively low deformations the data exhibit a complex, dense modal spectrum, which we interpret as the lasing of several WG modes. In addition, the lasers were multi-mode starting from the lasing threshold, with close mode spacing, $\Delta\lambda \geq 15$ nm, and show up to 10 almost equally strong modes at the maximum optical power.

Figure 4A:
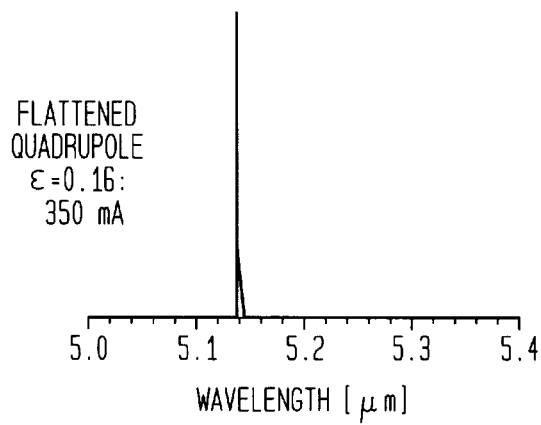
FIG. 4 compares the spectrum of a microdisk QC laser having a circular cylindrical resonator (FIG. 4B) with that of micro-cylinder QC laser having a flattened quadrupolar resonator ($\epsilon \approx 0.16$) in accordance with one embodiment of our invention (FIG. 4A). Both lasers had a center wavelength of about 5.14 $\mu$m. The data show that even at threshold (150 mA) the circular resonator laser exhibited multiple (angular) longitudinal and (radial) transversal modes, whereas at approximately twice threshold (350 mA) the laser deformed in accordance with our invention was spectrally pure (reduced spectral density), exhibiting only a single longitudinal mode, with side mode suppression ratio greater than 20 dB.
Figure 4B:
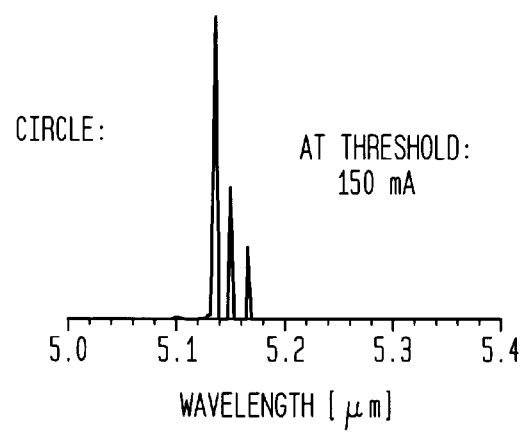

At relatively large deformations our lasers were single-mode until approximately twice the threshold current (FIG. 4A), and showed at most two or three strong modes at maximum power. The cross-over between the two spectrally characteristic regimes again occurred around $\epsilon \approx 0.12$.

The multi-mode behavior (including the weak side modes depicted in FIG. 3C, left inset) of the more highly deformed resonators is consistent with the emission from bow-tie modes. The logarithmic plot of a spectrum in this regime (FIG. 3C, left inset) reveals six equally spaced modes, with mode spacing $\Delta\lambda=40.4$ nm. The expected theoretical value was calculated assuming that adjacent modes differ by one wavelength along the modal path of the bow-tie. This calculation yielded a mode spacing of 39.5 nm, in excellent agreement with the experiment considering the uncertainty in the effective refractive index.

The bow-tie modes can easily be distinguished from the transverse modes of the diametral curved mirror Fabry-Perot resonator along the minor axis (length L) of the resonator. As noted above, bow-tie modes originate from a period-doubling bifurcation of the diametral modes, leading to approximately twice the optical path length. As such, the bow-tie mode spectrum displays approximately half the mode spacing one would expect of standard Fabry-Perot modes; i.e., the latter have a mode spacing of $\Delta\lambda=\lambda^2/(2nL)\approx 82$ nm, about twice the 40 nm spacing of bow-tie modes.

In summary, this example shows that semiconductor micro-cylinder lasers with a flattened quadrupolar resonators, sufficiently deformed to support bow-tie lasing modes, have substantially improved power output and directionality. In the favorable directions of the far-field power increases of up to three orders of magnitude have been obtained.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, although the above embodiments describe a disk-like laser, the term micro-cylinder is not so restricted and is intended to embrace cylindrical resonators with a wide variety of aspect ratios; i.e., those which have relatively small diameters and are relatively thin, as well those which have larger diameters and are thicker. In addition, our invention also embraces a micro-cylinder resonator which has the shape of a modified stadium shown in FIG. 6; that is, a resonator which includes a central section 20 having essentially parallel sides 20.1 and, on each end thereof, a circular section 22 which is not a full hemisphere (i.e., each circular section subtends an angle $\alpha$ which is less than 180°). The dimensions of the resonator (length and separation of the parallel sides; the radius R and angle $\alpha$ of the circular sections) are determined, as with other embodiments of our invention, by Poincare surface-of-section analysis to identify those configurations which support librational modes.

What is claimed is:

1. A semiconductor laser comprising
a cylindrically-shaped semiconductor body comprising a pair of cladding regions and QC active region disposed between said cladding regions, at least said active region comprising a multiplicity of InGaAs and InAlAs layers, the boundary of said body being a convex curve and forming a cavity resonator capable of supporting lasing modes of stimulated radiation when said active region is suitably pumped,
said boundary being deformed from circularity approximately in accordance with a flattened quadrupolar function $r(\phi)\propto[1+2\epsilon(\cos2\phi)]^{1/2}$, wherein $\epsilon \geq 0.12$, so that said resonator supports at least one librational mode.

2. The invention of claim 1 wherein said deformation is sufficient for said resonator to support at least one bow-tie librational mode.

3. The invention of claim 1 wherein said deformation is sufficient for said resonator to support at least one V-shaped librational mode.

* * * * *

UNITED STATES PATENT AND TRADEMARK OFFICE
CERTIFICATE OF CORRECTION

PATENT NO.    : 6,333,944 B1
DATED         : December 25, 2001
INVENTOR(S)   : Federico Capasso et al.

It is certified that error appears in the above-identified patent and that said Letters Patent is hereby corrected as shown below:

<u>Title page,</u>
Item [75], should read as follows:

-- [75] Inventors: Federico Capasso, Westfield, Alfred Yi Cho, Summit, Claire F. Gmachl, Short Hills, Deborah Lee Sivco, Warren, all of NJ (US), Jerome Faist, Neuchatel, Switzerland, Jens Uwe Noeckel, Dresden, Germany, Evgueni E. Narimanov, New Haven, Alfred Douglas Stone, North Haven, both of CT (US) --

Item [73], should read as follows:

-- [73] Assignee: Lucent Technologies Inc., DE (US)

Max-Planck-Gesellschaft zur Forderung der Wissenschaften e.V., Munchen, (DE)

Yale University, New Haven, CT (US) --

Signed and Sealed this

Twenty-fourth Day of December, 2002

JAMES E. ROGAN
*Director of the United States Patent and Trademark Office*